United States Patent
Tsujimura et al.

[11] Patent Number: 5,817,410
[45] Date of Patent: Oct. 6, 1998

[54] NONLINEAR OPTICAL COMPOSITES USING LINEAR TRANSPARENT SUBSTANCES AND METHOD FOR PRODUCING THE SAME

[75] Inventors: Ayumu Tsujimura, Osaka; Masaru Yoshida, Katano; Ichiro Tanahashi, Hirakata; Yoshio Manabe, Katano; Tsuneo Mitsuyu, Hirakata, all of Japan

[73] Assignee: Matsushita Electric Industrial Co., Ltd., Osaka, Japan

[21] Appl. No.: 495,186

[22] Filed: Jun. 27, 1995

[30] Foreign Application Priority Data

Nov. 18, 1991 [JP] Japan ................................. 3-301817
Nov. 18, 1991 [JP] Japan ................................. 3-301818

[51] Int. Cl.[6] ........................................ B32B 5/16
[52] U.S. Cl. ........................ 428/328; 428/332; 428/403
[58] Field of Search ............................. 428/328, 332, 428/403

[56] References Cited

U.S. PATENT DOCUMENTS

| 5,023,139 | 6/1991 | Birnboim et al. | 428/402 |
| 5,113,473 | 5/1992 | Yoshida et al. | 385/131 |
| 5,401,569 | 3/1995 | Kineri et al. | 428/323 |
| 5,464,991 | 11/1995 | Manabe et al. | 257/53 |
| 5,470,910 | 11/1995 | Spanhel et al. | 524/785 |
| 5,472,777 | 12/1995 | Kineri et al. | 428/323 |
| 5,530,956 | 6/1996 | Hiraoka et al. | 385/122 |

Primary Examiner—H. Thi Le
Attorney, Agent, or Firm—Amster Rothstein & Ebenstein

[57] ABSTRACT

The present invention relates to nonlinear optical composites for optical devices such as optical switches and to a method for producing the composites. The composites, comprising optically transparent substances exhibiting linear optical response and metal containing particles dispersed therein, utilize the nonlinear optical effect associated with the surface plasma resonance of a metal.

5 Claims, 1 Drawing Sheet

F I G. 1
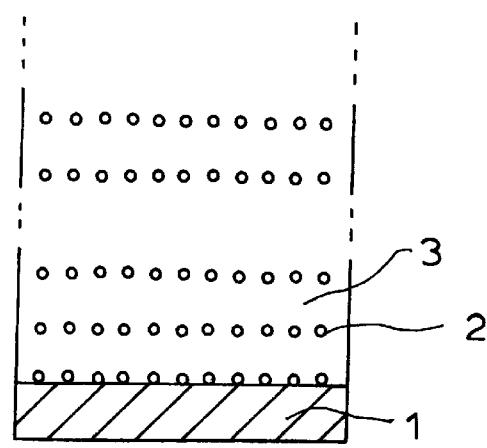
F I G. 2
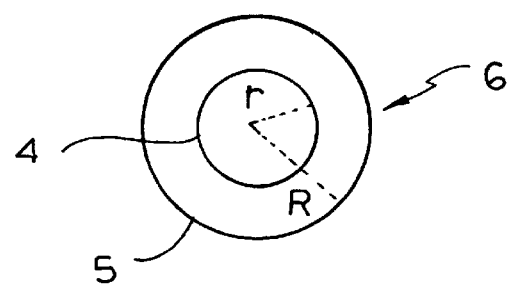
F I G. 3
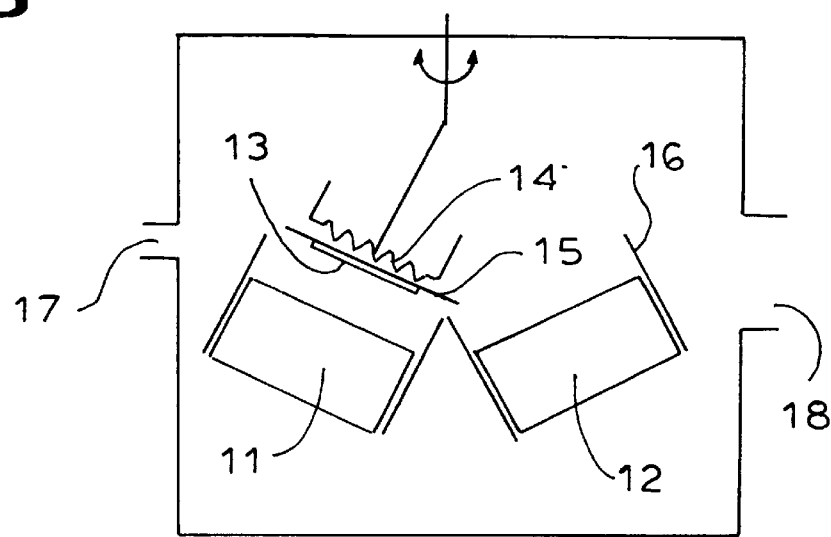

NONLINEAR OPTICAL COMPOSITES USING LINEAR TRANSPARENT SUBSTANCES AND METHOD FOR PRODUCING THE SAME

BACKGROUND OF THE INVENTION

This application is related to Ser. No. 08/317,833 filed Oct. 4, 1994, which is a continuation of Ser. No. 07/976,903 filed Nov. 16, 1992, now abandoned, the disclosure of which is incorporated by reference herein.

1. Field of the Invention

The present invention relates to nonlinear optical composites for optical devices such as optical switches and to a method for producing the composites. The composites, comprising optically transparent substances exhibiting linear optical response and metal containing particles dispersed therein, utilize the nonlinear optical effect associated with the surface plasma resonance of a metal.

2. Description of Related Art

It is reported in an article entitled "The Optical Kerr Effect in Small Metal Particles and Metal Colloids: The Case of Gold", by F. Hache, et al. *Applied Physics A* 47, 347–357 (1988) that dispersing microfine particles of a metal in glass results in an increased third-order nonlinear susceptibility of the metal and, hence, an increased optical nonlinearity.

According to the conventional production technology for a glass in which a finely divided metal powder has been dispersed, a gold-containing silicate glass prepared by the fusion method, for instance, is subjected to heat treatment to randomly disperse the metal in a finely divided state in a glass matrix.

The third-order nonlinear susceptibility of the conventional metal-dispersed glass produced in the above manner is as low as $10^{-14}$–$10^{-11}$ esu. This is because the proportion of metal in the glass is less than 0.01% by volume. In the conventional production process, if the proportion of the metal is increased any further, the critical concentration for a solid solution is exceeded, resulting in aggregation of particles and precipitation of bulky particles in the fusing stage, thus frustrating the attempt to disperse the metal in finely divided state in the glass matrix. Moreover, while the nucleation and growth of metal particles require a heat treatment, a thermodynamic equilibrium prevails during the treatment to cause a variation in particle diameter. As a consequence, the nonlinearity of the product glass is also subject to variation, making the glass deficient in controllability in its application as a nonlinear optical material.

SUMMARY OF THE INVENTION

The object of the present invention is to provide nonlinear optical composites with increased third-order nonlinear susceptibility and improved nonlinear optical characteristics and a method for producing such composites.

In a first aspect, the present invention provides a nonlinear optical composite which comprises an optically transparent substance exhibiting a linear optical response and a multiplicity of microfine metal particles dispersed independently of one another and forming a plurality of layers in said optically transparent substance.

In a second aspect, the invention provides a nonlinear optical composite which comprises an optically transparent substance exhibiting a linear optical response and a multiplicity of microfine particles each consisting of a core and a shell, at least one of which is composed of metal, said microfine particles having been dispersed independently of one another in said optically transparent substance.

In the nonlinear optical composite according to the first aspect of the invention, which comprises a dispersion of microfine metal particles in a plurality of layers in an optically transparent substance which alone exhibits a linear optical response, said aggregation and growth of metal particles will not occur even if the metal content is large. In other words, compared with the conventional nonlinear optical composite in which a low concentration of finely divided metal particles has been randomly dispersed in a substance which exhibits nonlinear response, metal particles greater in number and more uniform in diameter can be present in the optical composite, with the result that a sharper absorption waveform corresponding to the surface plasma resonance and a greater third-order nonlinear susceptibility can be obtained.

In the nonlinear optical composite according to the second aspect of the invention which comprises a multiplicity of microfine particles each consisting of a core and a shell dispersed in the optically transparent substance which alone exhibits a linear optical response, the space distribution of dielectric constant in said core and shell can be freely varied to optimize the local field intensity so that a greater third-order nonlinear susceptibility and a higher figure of merit (nonlinear susceptibility divided by absorption coefficient) can be realized a compared with the conventional randomly dispersed metal glass composite. Particularly, the nonlinear optical composite comprising dispersions of microfine core-shell particles yields still larger third-order nonlinear susceptibility and figure of merit.

The method of producing nonlinear optical composites according to the present invention comprises the steps of (a) providing a substrate, (b) forming a layer comprising microfine particles each composed of a metal or containing a metal and disposed independently of one another either on said substrate or on an optically transparent substance having linear response characteristics, (c) forming a layer composed of the optically transparent substance on said layer comprising microfine particles, and (d) repeating said step (b) of forming a layer comprising microfine particles and said step (c) of forming a layer composed of the optically transparent substance in alternating cycles.

In accordance with the above production method comprising a repeated alternate formation of the layer of microfine particles and the layer of the linear response optically transparent substance, the growth and aggregation of particles can be substantially inhibited and, therefore, an increased mass of microfine particles can be uniformly dispersed. As a consequence, a nonlinear susceptibility and a higher figure of merit can be successfully obtained.

Having excellent nonlinear optical characteristics, each of the nonlinear optical composites of the invention can be used to fabricate, for example, an optical switch which features a remarkably high switching speed. The composites can also be implemented into various devices, such as phase conjugated mirrors and nonlinear waveguides, taking advantage of their nonlinear optical characteristics.

BRIEF DESCRIPTION OF THE DRAWINGS

FIG. 1 is a schematic sectional view showing a nonlinear optical composite as an embodiment of the invention);

FIG. 2 is a schematic sectional view showing a microfine particle which is included in a nonlinear optical composite as another embodiment of the invention.

FIG. 3 is a schematic sectional view showing production equipment which can be used for the production of nonlinear optical composites in accordance with the invention.

DETAILED DESCRIPTION OF THE INVENTION

Referring to FIG. 1, the nonlinear optical composite according to the first aspect of the present invention comprises an optically transparent substance 3, which along exhibits a linear response, and a multiplicity of microfine metal particles 2 dispersed therein independently of one another and in a plurality of layers. The reference number 1 indicates a substrate for supporting said microfine metal particles 2 and optically transparent substance 3. Because it contains a very large number of microfine metal particles 2 which are uniform in size, this composite provides a remarkably higher third-order nonlinear susceptibility, typically a susceptibility of as high as about $1 \times 10^{-7}$ esu, than does the conventional composite containing a random dispersion of finely divided metal particles.

The material for the microfine metal particles 2 can be liberally selected from among a variety of metals but is preferably selected from the group consisting of gold, silver, copper, platinum, aluminum and palladium. These metals, particularly gold, are preferred not only because the imaginary part of their respective complex dielectric constants is small and they have surface plasma resonance frequencies in the region of optical transparency but also because they are highly stable in the particulate form and further are conducive to high third-order nonlinear susceptibility.

The configuration of round metal particles 2 is not critical and the metal particles may, for example, be spherical, spheroidal, hemispherical, hemispheroidal or dome-shaped. Spherical particles are particularly desirable, for this configuration is conducive to relatively larger third-order nonlinear susceptibility.

The mean diameter of the metal particles 2 should be sufficiently small to produce a local field effect. The mean diameter is preferably not more than 50 nm and, for still better results, about 1–15 nm. When the diameter of metal particles 2 exceeds 100 nm, the tendency to form bulky particles is increased thereby adversely affecting the optical nonlinear characteristics of the product. Meanwhile, in order to obtain a sharp plasma resonance waveform, it is preferable that the metal particles 2 be as uniform in diameter as possible. Stated differently, the standard deviation of the mean particle size distribution is preferably as small as possible. The preferred value of standard deviation, which depends on mean particle diameter, is not more than 10 nm assuming that the mean diameter of particles is 50 nm. A particularly sharp waveform is obtained when this condition is satisfied.

The concentration or volume fraction of metal particles 2 in the nonlinear optical composite is preferably as large as possible, since the larger the volume fraction, the larger the resulting third-order nonlinear susceptibility of the product. However, when the volume fraction exceeds 50%, the metal particles tend to contact each other resulting in a large apparent particle size, and thereby reducing the figure of merit. Therefore, the volume fraction of metal to linear response optically transparent substance is preferably in the range of 0.01 to 50% and more desirably in the range of 1 to 40%.

The linear response optically transparent substance 3 may be an inorganic crystalline substance or a vitreous substance, provided that it is optically transparent in the resonance frequency range necessary for the manifestation of nonlinear optical characteristics. Thus, as preferred examples, quartz glass, magnesium fluoride, LiF, $CaF_2$, $Al_2O_3$, borosilicate glass, aluminate glass, fluoride glass, etc. can be utilized. High molecular organic compounds exhibiting linear response such as acrylate resin, methacrylate resin, polystyrene, polyethylene, etc. can also be employed.

The substrate 1 is not essential but is provided only where necessary.

The second aspect of the invention is concerned with a nonlinear optical composite comprising a linear response optically transparent substance and a multiplicity of microfine particles 6 each consisting of a core 4 and a shell 5 and dispersed in a plurality of layers therein. This composite is now described in detail with reference to FIG. 2.

This nonlinear optical composite is characterized in that a still larger nonlinear susceptibility and a higher figure of merit can be obtained by dispersing microfine particles 6 each consisting of a core 4 and a shell 5, at least one of which is composed of metal in a linear response optically transparent substance. Thus, by varying the ratio of the mean radius r of core 4 to the mean radius R of shell 5, the percent gain in local field intensity on the metal surface can be controlled as desired and, moreover, the space distribution of dielectric constant in each medium, namely the core, the shell or the optically transparent substance, can be freely varied. Therefore, unlike the case in which particles exclusively composed of metal are employed, the local field effect can be optimized to increase the third-order nonlinear susceptibility and the figure of merit. The rationale is that being a value intrinsic to any substance, the dielectric constant begins to change as a function of particle diameter, after its size has been reduced to about a 0.1 nm. According to this second aspect of the invention, a figure of merit at least 100-fold as high can be obtained in comparison with particles exclusively composed of metal.

As the metal for constituting either one or both of core 4 and shell 5, a variety of metals can be utilized. However, since metals showing high rates of gain in local field intensity are those having small imaginary numbers of complex dielectric constant, it is preferable to use at least one metal selected from the group consisting of gold, silver, copper, platinum, aluminum and palladium. The material which may constitute the other element of the particle, i.e., either the core 4 or the shell 5, when it is not made of metal, may be a dielectric material exhibiting either linear or nonlinear response, for example, an inorganic crystalline substance, a vitreous substance or a high molecular organic compound. Specifically, the inorganic crystalline substance must be, among others, LiF, $CaF_2$, $MgF_2$, $Al_2O_3$, MgO, $CaCO_3$ and so on. The vitreous substance may be, among others, various types of oxide glass not containing rare earth metal and transition metal ions, fluoride glass and so on. The organic polymer may be, among others, acrylate resin, methacrylate resin, polystyrene, polyethylene, polyvinyl chloride and so on.

The configuration of the microfine particles 6 is not limited to round spheres. Spherical particles are particularly desirable, however, in that they contribute to third-order nonlinear susceptibility.

The mean diameter of microfine particles 6 must be sufficiently small to produce a local field effect and is preferably in the range of about 1 to 500 nm. If the particle diameter exceeds 1000 nm, the tendency to form bulky particles is increased which will reduce the nonlinear optical effect. The ratio r/R between the mean radius r of the core 4 and the mean radius R of the shell 5 may be in the range of $0 < r/< R$. Where only the core 4 is composed of metal, the geometric relation is preferably $0 < r \leq 25$ nm, $0.5 \leq R \leq 250$ nm and, for still better results, $0.5 \leq r \leq 7.5$ nm, $1 \leq R \leq 25$ nm.

Where only the shell 5 is composed of metal, the geometric relation is preferably 0<R≦250 nm, 0<R-r≦20 nm and more desirably 1≦R≦50 nm, 0<R-r≦10 nm. Where both the core 4 and the shell 5 are composed of metal, of different kinds, the geometric relation is preferably 0<R-r≦50 nm, 0<R-r≦15 nm and more desirably 0.5≦r≦7.5 nm, 0<R-r≦5 nm.

The volume fraction of microfine particles 6 in the second aspect of the invention is preferably as large as possible, since third-order nonlinear susceptibility increases in proportion to an increase in volume fraction. This fact has been experimentally confirmed for the range of 1 to 6% by volume of particles 6. The same tendency has been found with the nonlinear optical composite containing metal particles 2 in the first aspect of the invention. Accordingly, the preferred range for the volume fraction of microfine particles 6 is 0.01 to 50% and preferably 1 to 40%.

As the linear response optically transparent material for use in accordance with the second aspect of the invention, those inorganic crystalline substances and vitreous substances mentioned for the optically transparent material 3 according to the first aspect of the invention can be employed. Similarly, linear response organic compounds of high molecular weight can likewise be employed.

While a nonlinear optical composite comprising a dispersion of particles in a laminar pattern has been described above as a preferred embodiment, it should be understood that the composite obtainable by dispersing said core-shell particles randomly is also superior to the conventional composite, for purposes of third-order nonlinear susceptibility.

In a third aspect, the present invention is concerned with a method for producing nonlinear optical composites. A preferred embodiment is now described.

First, a substrate is set in position in a sputtering or vacuum vapor deposition chamber and vaporized metal particles are deposited on the substrate. The oncoming vaporized metal particles rapidly lose their energies in the direction perpendicular to the substrate and arrive at the substrate. However, since they are in the state of transition from gas phase to solid phase and have not reached a thermodynamic equilibrium as yet, the particles drift about on the substrate surface and, as they are caught by sites for adsorption such as pinholes, settle down on the surface of the substrate. If no sites for adsorption are available, the impinging particles are revaporized. As several of the successively generated vaporized metal particles gather together, they form crystal seeds locally. This formation of crystal seeds is followed by growth of insular structures. The bombardment by metal vapor particles is arrested at this stage with a distribution of microfine particles of the metal in the form of islets obtained on the substrate. These metal particles are generally in plane contact with the substrate and are not spherical but either semispherical or semispheroidal.

For the formation of microfine particles each having a metal core, the vapor of either a metal or a dielectric material for the shell are deposited on the metal core. In this process, the metal particles deposited in the form of islets function as sites for adsorption so that the vapor particles are selectively deposited on and cover the metal particles. This bombardment of the surface by vapor particles is terminated when a predetermined amount of deposit has been obtained. When the core is made of a dielectric material, the above deposition steps are reversed.

A layer composed of a linear response optically transparent substance is then formed, in a thickness greater than the diameter of the metal particles or core-and-shell particles, on the layer comprising the particles in such a manner that the subsequently deposited layer covers the metal or particle layer. The oncoming particles of the vaporized linear response optically transparent substance release their kinetic energy as thermal energy as that a transition to a new thermal equilibrium takes place at the vapor-surface interface. If and when the particles there receive a thermal energy sufficient to fully cancel the difference in interface energy, the particles become spherical. While both the interface energy and the kinetic energy of vapor particles vary according to the kinds of metal and optically transparent substance used as well as the conditions of formation, it is a recommendable procedure, when the sputtering or vacuum vapor deposition process is employed, to heat the deposition surface at an appropriate temperature to provide an energy sufficient to make the particles spherical.

The heating temperature for the deposition surface cannot be stated in general terms because, as pointed out above, the proper temperature is dependent on the conditions of formation and the kinds of materials used. However, the range of 100° to 700° C. is generally appropriate for the relevant materials. Usually when an organic material such as an organic polymer is used for the optically transparent material, a comparatively low temperature is used, while a comparatively high temperature can be used when an inorganic compound, such as quartz glass, which melts at a high temperature, is employed.

Subsequently, on the layer composed of the linear response optically transparent substance, a layer of microfine metal particles or microfine core-and-shell particles is further formed and, thereafter, another layer of said optically transparent substance is further superimposed. By repeating the step of forming a layer of microfine particles and the step of forming a layer of said optically transparent substance alternately, there is obtained a nonlinear optical composite in which either microfine metal particles or microfine core-shell particles have been dispersed in a plurality of discrete layers in the optically transparent substance.

The diameter of microfine particles in this composite can be controlled by varying the conditions of formation and the deposition surface heating temperature. Moreover, the plane density of microfine particles in the dispersion layer can be controlled by varying the kinetic energy of vapor particles and the surface heating temperature.

Furthermore, the volume fraction of microfine particles can also be controlled by varying the formation mass of the optically transparent substance. Experimentally, the volume fraction of metal to optical substance was large, namely 40% at the maximum for the metal particles and 6% at the maximum for the core-shell particles. Thus, compared with the conventional composite, a remarkably increased mass of microfine particles could be incorporated.

The material for the substrate may be the same as the optically transparent substance used. Moreover, when the fabricated nonlinear optical composite is to be separated from the substrate after fabrication, the substrate need not be a transparent material.

In consideration of the ease of control over the diameter and content of microfine particles, the method of the invention is preferably carried into practice by sputtering using vacuum vapor deposition. The ordinary sputtering process can be carried out using argon for the sputtering gas. In the reactive sputtering process, an appropriate mixture of argon gas with $O_2$, $N_2$, $NH_3$, $CH_4$, $H_2S$ or the like can be employed. The sputtering pressure is generally about $10^{-2}$ to 10 Pa. The vacuum vapor deposition is carried out at a reduced pressure of about $10^{-3}$ Pa to $10^{-4}$ Pa. Which of these processes is selected depends on the consideration of the melting points, vapor pressures, oxidation potentials, etc. of the materials used.

As mentioned hereinbefore, substrate heating is recommended to encourage the formation of spherical particles. For this purpose, the substrate is preferably maintained at a temperature of about 100° to 700° C.

EXAMPLE 1

Using the sputtering equipment schematically illustrated in FIG. 3, a nonlinear optical composite of the invention was manufactured by the sputtering technique. The sputter sources comprised a quartz ($SiO_2$) glass target 11 and a gold (Au) target 12. The substrate, indicated at 13, was rigidly secured to a substrate holder 15 equipped with a heater 14 in such a manner that the substrate 13 could be selectively positioned over either the $SiO_2$ target 11 or the Au target 12 by rotating the substrate holder 15 through a rotary drive shaft directly coupled to the holder 15. The position and duration of stay over either target were computer-controlled. For prevention of contamination during deposition, each of the targets was provided with a shield plate 16 extending around the target and projecting beyond its forward end. Quartz glass was used for the substrate 13, and argon gas for the sputtering gas. The argon gas was admitted from a gas inlet 17 and withdrawn from a gas outlet 18 which was connected to a vacuum pump (not shown). The gas pressure was 1.0 Pa, the substrate temperature was 400° C., the power applied to the $SiO_2$ target 11 was 250 W, and the power applied to the Au target 12 was 10 W.

First, the substrate 13 was caused to say over the Au target 12 for 5 seconds to deposit microfine particles of Au on the substrate 13. Then, the substrate 13 was rotated into position over the $SiO_2$ target 11 and held there stationary for 5 seconds to deposit an $SiO_2$ film thereon. The above procedure for sequential deposition of Au and $SiO_2$ on the substrate 13 was repeated a total of 500 times to give a nonlinear optical composite (Sample No. 1) consisting in a laminar structure in which microfine particles of Au have been dispersed in a plurality of discrete layers in the SiO2 glass.

The thickness of the thus-fabricated nonlinear optical composite (Sample No. 1) was 2 mm. The mean diameter of spherical Au particles was 2 nm, the standard deviation of particle diameter distribution was 0.4 nm, the interval between Au dispersion layers was 4 nm and the volume fraction of Au particles was 40%.

Other nonlinear optical composites were also fabricated by changing the duration of stay over the Au target 12. In Sample No. 2, corresponding to a duration of 7 seconds, the mean particle diameter was 4 nm and the standard deviation of particle diameter distribution was 0.7 nm. In Sample No. 3, correspond to a duration of 10 seconds, the mean particle diameter was 7 nm and the standard deviation was 1 nm.

In Sample No. 4, which was fabricated at room temperature without heating the substrate, the Configuration of Au particles was substantially hemispherical with a mean diameter of 2 nm.

In Sample No. 5, which was fabricated in the same manner as Sample No. 1 except that an Ag target was used in lieu of the Au target, the mean diameter of spherical Ag particles was 5 nm, the standard deviation of particle diameter distribution was 0.7 nm, and the volume fraction of Ag was 25%.

The third-order nonlinear susceptibility of Samples No. 1, No. 4 and No. 5 was determined. At the measuring wavelength of 515 nm, Sample No. 1 showed a susceptibility of $4.8 \times 10^{-7}$ esu. The third-order nonlinear susceptibility of Sample No. 4 was $1.0 \times 10^{-7}$ esu. As measured at 400 nm, the susceptibility of Sample No. 5 was $9.2 \times 10^8$ esu. The determination of third-order nonlinear susceptibility was carried out by the degenerate four-wave mixing method.

In addition, using Sample No. 1 and two external mirrors, a Fabry-Perot cavity was constituted and an optically bistable device was constructed. A laser beam with a wavelength of 515 nm was caused to be incident, with a sport diameter of 5 mm, on the above device and the relative intensity of incident light and emergent light was measured at room temperature (25° C.). As a result, the device showed an optically bistable characteristic and gave a remarkably high switching speed of not more than 5 psec.

Using Sample No. 5, an optically bistable device was similarly constructed. A laser beam with a wavelength of 400 nm was projected, with a spot diameter of 5 mm, on the device, and the relative intensity of incident light and emergent light was measured at room temperature (25° C.). The device showed an optically bistable characteristic and provided a remarkably high switching speed of not more than 5 psec.

Nonlinear optical composites containing a laminar dispersion of microfine metal particles with a diameter of 1 to 10 nm were respectively obtained when a copper (Cu), platinum (Pt) or palladium (Pd) target was used in lieu of the Au or Ag target. The third-order nonlinear susceptibility of these composites was invariably higher than that of the conventional nonlinear optical composite.

EXAMPLE 2

Nonlinear optical composites of the invention were fabricated by the vacuum vapor deposition technique, in lieu of the sputtering technique, in which each vapor source was placed on a tungsten boat and vaporized by resistance heating instead of employing the sputtering targets shown in FIG. 3. The arrangement for the substrate holder and the provision of a shield plate for each vapor source were the same as in the setup illustrated in FIG. 3. Magnesium fluoride ($MgF_2$) was used for the linear response optically transparent substance, Au for the metal, and quartz glass for the substrate. The degree of vacuum was $10^{-4}$ Pa, the substrate temperature was 200° C., the power applied to the boat carrying Au was 200 W.

First, the substrate was positioned over the Au vapor source for 2 seconds to deposit microfine particles of Au on the substrate. Then, the substrate was rotated into position over the $MgF_2$ vapor source and held there stationary for 5 seconds to deposit a $MgF_2$ film thereon. The above procedure for sequential deposition of Au and $MgF_2$ on the substrate was repeated a total of 400 times to give a nonlinear optical composite consisting in a laminar structure in which microfine particles of Au have been dispersed in discrete layers in the $MgF_2$ glass.

The thickness of the thus-fabricated nonlinear optical composite (Sample No. 6) was 2.4 mm. The mean diameter of Au particles, which were spherical, was 3 nm, the standard deviation of particle diameter distribution was 0.5 nm, the interval between Au dispersion layers was 6 nm and the volume fraction of Au particles was 40%. The third-order nonlinear susceptibility of Sample 6 at the wavelength of 519 nm was $4.5 \times 10^{-7}$ esu.

Similar nonlinear optical composites each containing a laminar dispersion of microfine metal particles in the diameter range of 1 to 10 nm were respectively obtained by using Ag, Cu, Pt or Pd in lieu of Au. All of these composites exhibited high third-order nonlinear susceptibilities.

EXAMPLE 3

By using the sputtering technique and the equipment schematically illustrated in FIG. 3, a nonlinear optical composite comprising a dispersion of microfine particles each consisting of an aluminum (Al) core and an alumina ($Al_2O_3$) shell in lithium fluoride (LiF), a linear response optically transparent substance, was fabricated. The sputter source comprised an LiF target and an Al target. $SiO_2$ glass was used for the substrate and argon gas for the sputtering gas. The gas pressure was 1.0 Pa, the substrate temperature was 300° C., the power applied to the LiF target was 150 W, and the power applied to the Al target was 7 W.

First, the substrate was positioned over the Al target for 7 seconds to deposit microfine particles of Al on the substrate. During the last 2 seconds of the above period, reactive sputtering was carried out by admitting oxygen gas from the gas inlet 17 to establish a total pressure of 3.0 Pa to thereby form a shell composed of $Al_2O_3$. Then, the substrate was rotated into position over the LiF target and held there stationary of 10 seconds to deposit an LiF film thereon. The above procedure for sequential deposition of Al and LiF on the substrate was repeated a total of 250 times to give a nonlinear optical composite consisting in a laminar dispersion of microfine particles each consisting of an Al core and an $Al_2O_3$ shell in a LiF matrix.

The thickness of the thus-fabricated nonlinear optical composite (Sample No. 8) was 2 mm. The mean diameter of microfine particles was 3 nm (r=1 nm, R=1.5 nm), the interval between dispersion layers was 8 nm and the volume fraction of particles was 6%.

In other nonlinear optical composites which were fabricated by changing the duration of said reactive sputtering over the Al target, the geometric relation of the core and shell was r=1.5 nm, R=1.5 nm in Sample No. 7 (reactive sputtering time 0 second; particles composted exclusively of Al), r=0.6 nm, R=1.5 nm in Sample 9 (4 seconds) and r=0.3 nm, R=1.5 nm in Sample No. 10 (6 seconds).

The third-order nonlinear susceptibility and figure of merit at the surface plasma resonance wavelength of each sample were determined by the degenerate four-wave mixing method. The respective values of Sample No. 7 were $1.3 \times 10^{-8}$ esu and $3.7 \times 10^{-11}$ esu.cm at the wavelength of 210 nm. The values of Sample 8 were $5.9 \times 10^{-6}$ esu and $4.7 \times 10^{-8}$ esu.cm at the wavelength of 225 nm, those of Sample No. 9 were $3.5 \times 10^{-6}$ esu and $1.6 \times 10^{-8}$ esu.cm at 230 nm, and those of Sample No. 10 were $8.2 \times 10^{-7}$ esu and $9.8 \times 10^{-9}$ esu.cm at 235 nm. In Sample Nos. 8 through 10 in which $Al_2O_3$ was used as the shell material, more satisfactory nonlinear optical characteristics were obtained as compared with Sample No. 7 in which microfine particles each composed exclusively of Al were employed.

Nonlinear optical composites exhibiting satisfactory characteristics were also obtained by using a silver (Ag) or copper (Cu) target in lieu of the Al target.

In Sample No. 11 which was fabricated without heating the substrate under otherwise the same conditions as Sample No. 10, the microfine particles were not spherical but hemispherical. The nonlinear susceptibility and figure of merit of Sample 11 were $2.0 \times 10^{-7}$ esu and $2.5 \times 10^{-9}$ esu.cm at the wavelength of 235 nm.

EXAMPLE 4

The sputtering equipment schematically illustrated in FIG. 3 was supplemented with one further sputtering target to constitute a sputter source consisting of a quartz ($SiO_2$) glass target, an aluminum (Al) target and a gold (Au) target. Using the above equipment, a nonlinear optical composite comprising a laminar dispersion of core-shell particles each consisting of an Al core and an Au shell in $SiO_2$ glass, a linear response optically transparent substance, was fabricated. The arrangement for the substrate holder and the provision of a shield plate for each vapor source were the same as in the setup illustrated in FIG. 3. $SiO_2$ glass was used for the substrate and argon gas for the sputtering gas. The gas pressure was 1.0 Pa, the substrate temperature was 400° C., the power applied to the $SiO_2$ target was 250 W, and the power applied to the Al and Au targets was 10 W each.

First, the substrate was positioned over the Al target for 10 seconds to deposit microfine Al particles for the formation of cores on the substrate. Then, the substrate was rotated into position over the Au target and held there stationary for 5 seconds to deposit Au particles for the formation of shells on the Al particles. Then, the substrate was further rotated and held stationary over the $SiO_2$ target for 15 seconds to thereby deposit an $SiO_2$ glass.

The thickness of the thus-fabricated nonlinear optical composite (Sample No. 14) was 3 mm. The mean diameter of the microfine particles was 4 nm, r=1.5 nm, R=2 nm, the interval between dispersion layers was 12 nm and the volume fraction of particles was 5%.

In addition, the deposition times for Al and Au were varied to fabricate Sample No. 12 (r–0 nm, R=2 nm; Au particles), Sample No. 13 (r=0.5 nm, R=2 nm) and Sample No. 15 (r=1.8 nm, R=2 nm).

Then, the figures of merit at the surface plasma resonance wavelengths of these samples were determined by the degenerate four-wave mixing method. The figure of merit was $1.3 \times 10^{-11}$ esu.cm for Sample No. 12 at the wavelength of 520 nm, $7.9 \times 10^{-10}$ esu.cm for Sample No. 13 at 505 nm, $1.0 \times 10^{-8}$ esu.cm for Sample No. 14 at 475 nm and $2.8 \times 10^{-9}$ esu.cm for Sample No. 15 at 430 nm. Compared with Sample No. 12, containing microfine particles composed exclusively of Au, the maximum figures of merit of Sample Nos. 13 through 15 were nearly 1,000-fold as high.

Nonlinear optical composites with satisfactory figures of merit were invariably obtained when Ag, Cu, platinum (Pt) or palladium (Pd) target was used in lieu of the Au target.

In addition, using Sample No. 14 and two external mirrors, a Fabry-Perot cavity was constituted and an optically bistable device was constructed. A laser beam with a wavelength of 475 nm was caused to be incident, with a spot diameter of 5 mm, on the device and the relative intensity of incident light and emergent light was measured at room temperature (25° C.). As a result, the device was found to have an optically bistable characteristic and gave a remarkably high switching speed of not more than 5 psec.

In the case of an optically bistable device constructed using the composite of Sample No. 13, too, a remarkably high switching speed of not more than 5 psec was obtained with a laser beam having a wavelength of 505 nm.

The above description and examples are merely illustrative of a few modes of application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A nonlinear optical composite comprising an optically transparent substance exhibiting a linear optical response and a multiplicity of conductor metal particles dispersed independently of one another in a plurality of discrete layers within said optically transparent substance wherein the diameter of said particles is 100 nm or less, and the volume fraction of said particles is in the range of 1 to 40%.

2. A nonlinear optical composite according to claim 1 wherein said particles are made of at least one metal selected from the group consisting of gold, silver, copper, platinum, aluminum and palladium.

3. A nonlinear optical composite according to claim 1 wherein said particles are spherical.

4. A nonlinear optical composite according to claim 1 wherein said particles have a mean diameter of not more than 50 nanometers.

5. A nonlinear optical composite according to claim 1 wherein the standard deviation of the mean diameter of said particles is not more than 10 nanometers.

* * * * *